Sept. 11, 1923. 1,467,350
R. A. ABBOTT
MIRROR
Filed April 8, 1922

Inventor
Reuben A. Abbott

Eccleston & Eccleston
Attorneys

Patented Sept. 11, 1923.

1,467,350

UNITED STATES PATENT OFFICE.

REUBEN A. ABBOTT, OF LAWRENCE, MASSACHUSETTS.

MIRROR.

Application filed April 8, 1922. Serial No. 550,736.

*To all whom it may concern:*

Be it known that I, REUBEN A. ABBOTT, a citizen of the United States, and a resident of Lawrence, in the county of Essex and State of Massachusetts, have made certain new and useful Improvements in Mirrors, of which the following is a full, clear, and exact description.

My invention relates to mirrors, and more particularly to mirrors used on automobiles or other vehicles.

One of the objects of the invention is to provide a mirror of this character which will present a very neat and attractive appearance.

Another object of the invention resides in the provision of a mirror of this character which will reflect a clear image to the rear and either side of the traveled way, and which will also reflect the image of the occupants of the vehicle.

A further object of the invention is to provide a mirror of this character which is always adjusted to the road.

Another and further object of the invention is the provision of a mirror and mounting therefor of such form that the accumulation of dirt and moisture causing deterioration of the silvered surface is prevented.

Other and further objects and advantages of the invention will be apparent from the following detailed description, when taken in connection with the accompanying drawing, in which.

Figure 1:
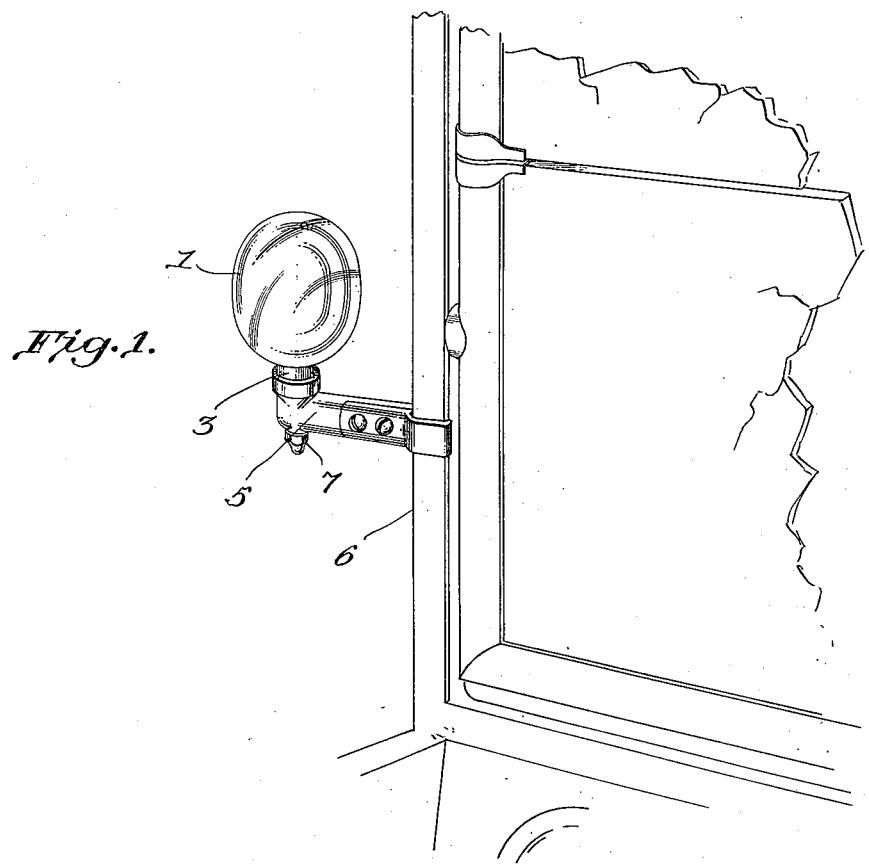
Figure 1 is a perspective view of the mirror mounted on the windshield frame.
Figure 2:
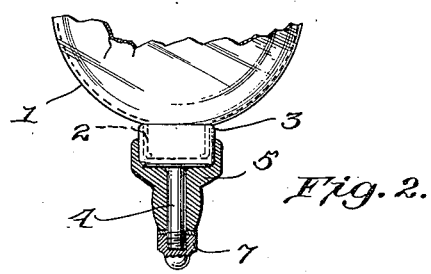
Figure 2 is a fragmentary view, showing one possible arrangement for mounting the mirror.
Figure 3:
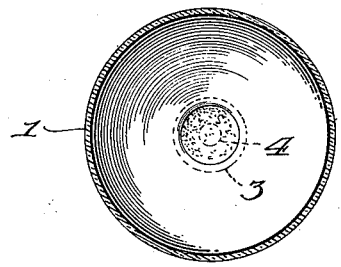
Figure 3 is a horizontal sectional view through the mirror.

Referring to the drawings more in detail, numeral 1 indicates the mirror which I have illustrated as of a general spherical shape, though in the particular form shown the vertical axis is somewhat longer than the horizontal axis. If desired, however, I may make the mirror a perfect sphere, or it may have the shape of an ellipsoid, or any other desired shape which will present a reflecting surface in practically all directions, and which will, therefore, always be adjusted to the road.

The mirror may be mounted on the windshield or mud-guard or in any other desired location on the automobile or other vehicle. In the particular instance illustrated I have shown the mirror mounted on the windshield frame of an automobile.

Various means may be devised for attaching the mirror to the vehicle, and the particular means shown herein are to be considered merely as illustrative. In the specific construction shown I have provided the mirror with a projection or knob 2, which is mounted in a metallic collar 3 having a bolt 4 extending downwardly from the under side thereof. A bracket 5 is detachably mounted on the windshield frame 6; the bracket being provided with a passage through which the bolt extends. A nut 7 screw threadedly engaging the lower end of the bolt 4 secures the parts firmly in place.

By providing a continuous spherical reflecting surface, having the attaching means at the lowest point of the structure, there is no tendency for dirt or moisture to accumulate on the reflecting surface. In the form of mirrors now ordinarily employed for this purpose, a circular or rectangular frame surrounds the reflecting element and being constantly subjected to the elements, dirt and rain and snow creep in between the frame and mirror and this constant accumulation causes a rapid deterioration of the mirror surface.

From the foregoing description it will be apparent that I have devised a mirror that is extremely neat and attractive in appearance.

It will also be obvious that as the mirror is circular in transverse section it will always be adjusted to the road, which is a great improvement over the previously known mirrors, in that they are continually being jolted out of adjusted position.

It will also be obvious that because of the continuous convex surface of the mirror the operator will have a clear reflection of traveled way, both directly to the rear and to either side, and he will also have a reflection of the occupants of the car.

In accordance with the patent statutes, I have described what I now believe to be the best embodiment of the invention, but I do not wish to be understood thereby as limiting myself or the scope of the invention, as many changes and modifications may be made without departing from the spirit of the invention; and all such I aim to include in the scope of the appended claims.

What I claim as new and desire to secure by Letters Patent is:

1. A rear viewing device for an automobile or similar vehicle, comprising a substantially spherical reflecting member, means for mounting the member on the vehicle forwardly of and to one side of the driver's seat whereby objects to both sides and in the rear of the reflecting member may be viewed by the driver by reflection in said member.

2. A rear viewing device for an automobile or similar vehicle, comprising an element having a reflecting surface of substantially spherical contour, the vertical axis being of greater length than the horizontal axis thereof, means for mounting the element on the forward part of the vehicle whereby the reflecting surface of the element is always in road reflecting position with relation to the driver's seat.

REUBEN A. ABBOTT.